F. C. COPPAGE.
Harvester.

No. 55,763.

2 Sheets—Sheet 1.

Patented June 19, 1866.

WITNESSES:

INVENTOR:

F. C. COPPAGE.
Harvester.

No. 55,763.

2 Sheets—Sheet 2.

Patented June 19, 1866.

UNITED STATES PATENT OFFICE.

FRANCIS C. COPPAGE, OF TERRE HAUTE, INDIANA, ASSIGNOR TO HIMSELF AND WM. COPPAGE.

IMPROVEMENT IN HARVESTERS.

Specification forming part of Letters Patent No. 55,763, dated June 19, 1866.

*To all whom it may concern:*

Be it known that I, FRANCIS C. COPPAGE, of Terre Haute, in the county of Vigo and State of Indiana, have made new and useful Improvements in Harvesters; and I do hereby declare the following to be a full, clear, and exact description of the nature, construction, and operation of the same sufficient to enable one skilled in the art to which it appertains to construct and use the same, reference being had to the accompanying drawings, which are made part of this specification, and in which—

Figure 1:
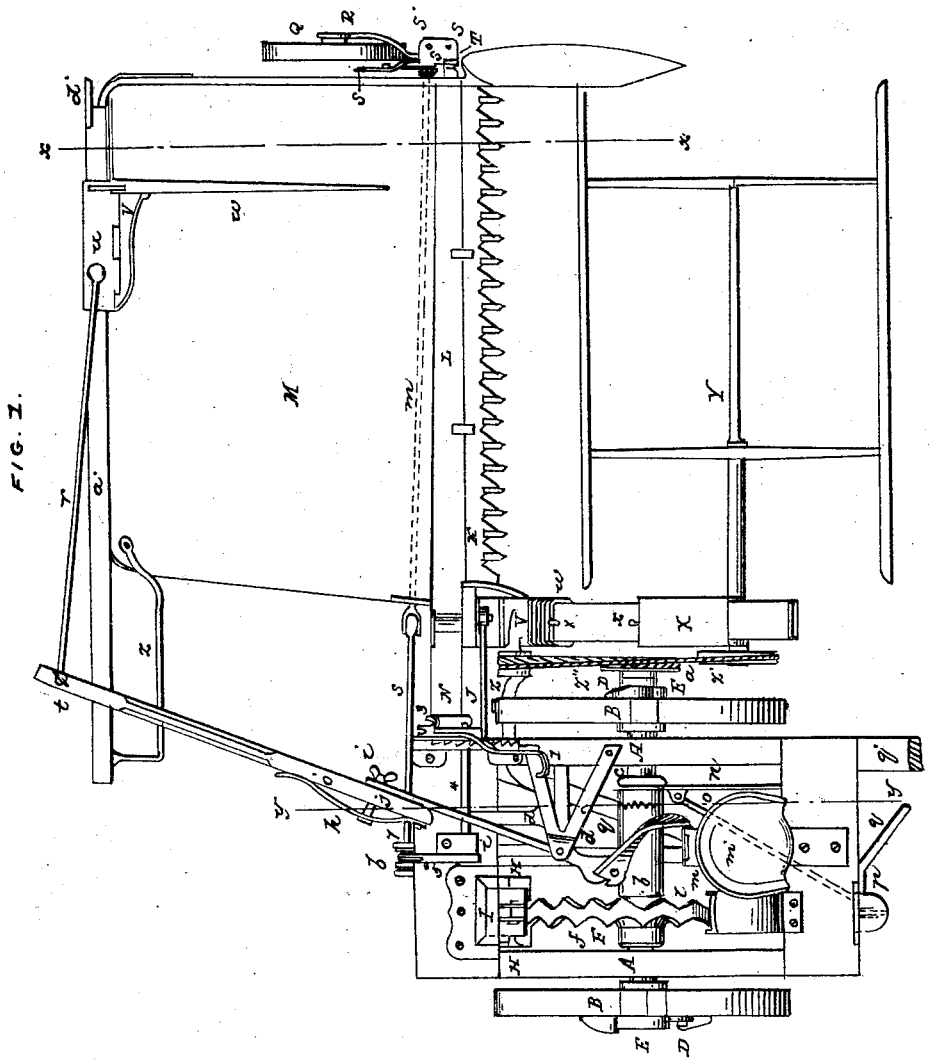
Figure 2:
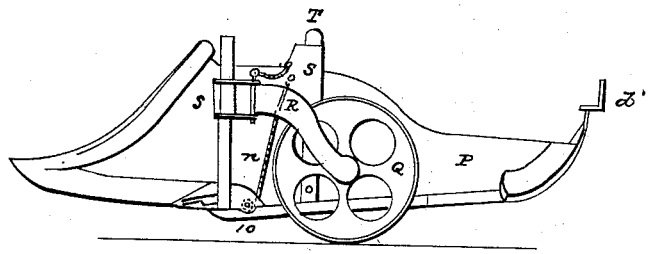
Figure 3:
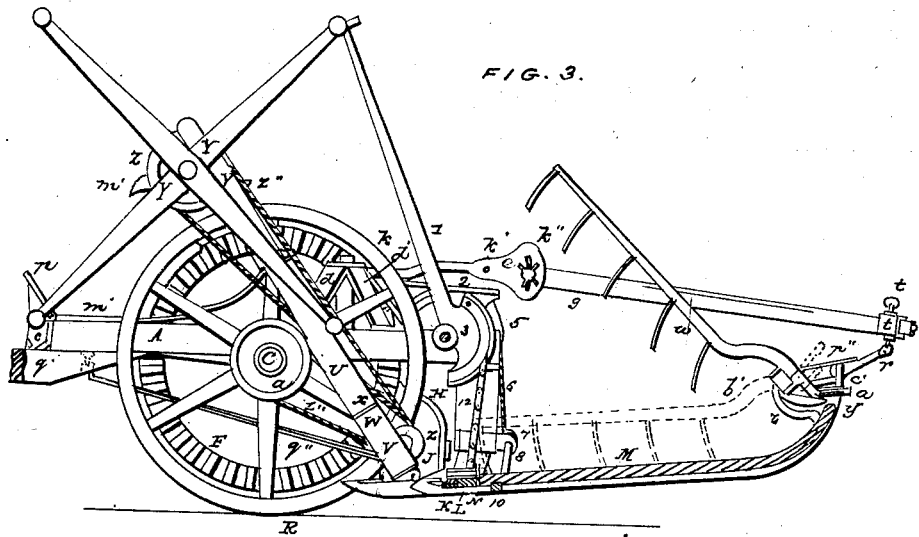
Figures 4, 5:
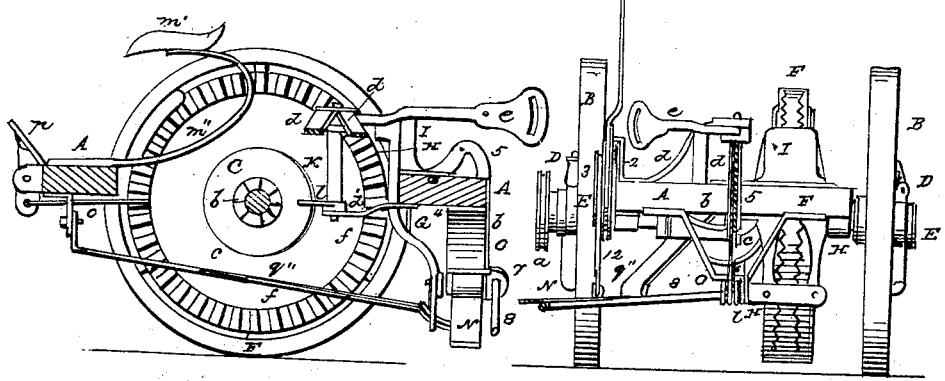

Figure is a plan or top view of the machine. Fig. 2 is a view of the shoe, grain-wheel, and divider on the outer end of the platform and finger-bar. Fig. 3 is a vertical section on the line $x$ $x$, Fig. 1, looking toward the main carriage. Fig. 4 is a section on the line $y$ $y$, Fig. 1, looking toward the convolute wheel F, which actuates the cutting apparatus. Fig. 5 is a rear view of the main carriage.

My improvement consists in the means of regulating the height of the platform and in the mode of adjusting the rake-lever: first, a rotating bar underneath the platform connects the devices which lift the inner end of the platform with those at the outer end, so as to secure unanimity of motion at both ends and preserve the parallelism of the platform and surface over which it traverses; second, the rake-arm is pivoted to a post on the main frame and receives its motion in a horizontal plane from a spiral fin or cam on the main axle, the outer end of the rake-arm being connected by a pitman to the sliding rake-head, on which the rake is pivoted, admitting of its vertical motion to seize and deliver the gavel.

The detail of the novel points of construction and operation will be described presently.

In the drawings, the main frame of the carriage A A is supported upon wheels B B, which rotate on an axle, C, carrying the axle with them when the machine is traveling forward, and the pawls D are caused to engage with the ratchet-wheels E on the said axle. This shifting arrangement is for the purpose of throwing the machinery out of gear with the drive-wheels when the harvester is passing from or to the fields of its operation, and is not peculiar in any respect to the machine herein described.

The cutting apparatus shown in the drawings and the mode of driving it are made the subject of a contemporary application, and only a general description will be here given.

On the axle C is firmly keyed a wheel, F, having projections $f f$, which extend parallel to its axis, from its respective faces near the periphery. These projections come in contact, as the wheel F is rotated, with pallets G in the vibrating frame H, which is suspended from a bracket, I, fastened to the main frame A. To the lower end of the said vibrating frame is attached the pitman J of the cutter-bar K, which reciprocates in the usual manner in its seat in the finger-bar L.

The platform M of the machine is attached to the carriage-frame A by the brace N and bracket O. Its outer end has a shoe, P, which is supported upon a caster-wheel, Q, journaled upon a leg, R, which has a vertical axis at S, so as to allow it to act as a caster-wheel when the machine is turning. The leg R is pivoted in a frame, S, which slides up and down on the guides T T as the platform is raised and lowered, by means to be described, to adapt the height of the cutting apparatus to the kind of work to be performed.

Hinged to the platform, at a point near the carriage, is a reel-post, U, carrying a reel, Y, which is journaled in a sleeve, X, supported at the required height by a pin, $x$, and driven by a cord or chain, $Z''$, which, passing from the pulley $a$ on the main shaft C, goes around pulleys Z, which are journaled on the sleeve V at the foot of the reel-post, and from them passes to the pulley $Z'$ on the reel-shaft, giving motion to it. The post U is pivoted at its lower end, so as to admit of a vibratory forward or backward motion, the former to bring it to the required position for gathering in the grain and pressing it toward the cutter, and the latter to lay it backward over the platform, to be more out of the way in moving. This moving has the effect of varying the tension of the cord $Z''$, and provision is made in the spring W and pin $x'$ for pressing downward upon the sleeve V, so as to keep the required tension upon the cord.

The raking arrangement consists of a handle, $e$ $g$, attached together by a pin, $j$, and bolt $i$, so as to have a vertical adjustment in the slotted piece $c$ and an elastic pressure due to the spring $h$. The rake-handle is attached to a vertical post, K, which is pivoted in holders $d\ d\ d'$, the motion in a horizontal plane of the rake-handle being due to the engagement of the forked piece $l$, attached to the post K, with the pin $c$ on the sleeve $b$, which surrounds the axle C. This sleeve, it may be as well to state in this place, is only rotated with the axle when the clutch $m$ engages with it. By pressure upon the foot-piece $p$, and the motion of the rod $o$, the clutch may be thrown out of gear when the rake becomes inoperative, as the sleeve $b$ and pin $c$ cease to act upon them. On withdrawing the pressure of the foot from the pedal $p$ the clutch $m$ again engages as it is pushed in by the spring $n$, and the rake resumes its motions, which are intermitted to any degree, at the will of the operator, by the temporary disconnection just explained.

On the end of the rake-handle $g$, which has just been described, is a pitman, $r$, whose point of attachment to the said handle is regulated by the box $t$ and set-screw $t'$. The pitman at its outer end is attached to the rake-head $u$, which slides in the track $a'$, as the rake-handle vibrates, as has been above explained. The rake proper, $w$, is hinged to the head $u$, so as to permit a vertical motion. $b''$ represents a spring-piece affixed to the rake so as to retain it by catching over the post $c'$, in the position shown in Fig. 3, ready to return for another gavel. $b'$ is a roller underneath the rake, to lessen its friction when rising upon the bent rod Z, which causes it, after it has drawn the gavel to the end of the platform, to rise and become disengaged from the grain. On reaching the outer end of the track $a'$ the spring $b''$ is raised by the incline $d'$ and the rake dropped again to convey another gavel off the platform.

$q$ is a brace passing from the frame A to strengthen the tongue $q'$, and $q''\ q''$ are braces attaching the bar N to the main frame A. $m$ is the seat supported by the spring-piece $m'''$ The mode of regulating the height of the platform remains to be described.

1 is a lever journaled on a shaft, 4, and retained by the engagement of a catch on its side with the rack 2. On the said shaft is a quadrant, 3, upon which the chain 12 winds as the lever 1 is depressed, raising the bar N, to which it is attached, and consequently lifting the near end of the platform. On the shaft 4 is another quadrant or other sector, 5, upon which winds the cord 6, rotating the pulley 7, rod 8, gimbal-joint 9, and rod 10, the latter of which passes under the platform M, and by winding up the cord 11 draws down the frame S upon the slides T T, raising the outer end of the platform. By these means the inner and outer ends of the platform are adjusted simultaneously by a single motion, one sector, 3, acting immediately upon the inner end, and the other, 5, acting, through the medium of the cord 6, rods 8 10, and cord 12, upon the outer end.

Having described my invention, what I claim therein as new, and desire to secure by Letters Patent, is—

1. The jointed lever $e\ g$, adjustable vertically at the end by means of the slot, set-screw, and pivot $k''\ k'$, and as to working length by the sleeve and set-screw $t\ t'$, substantially as described.

2. The jointed connecting-rod 8 9 10 in its relation to the winding devices at the inner and outer ends of the platform, substantially as and for the purpose described.

3. The arrangement of the sliding frame S, guides T T, leg R, caster-wheel Q, and shoe P, in combination with the jointed shaft 8, arranged and operated in the manner and for the purpose set forth.

The above specification of my improvements in harvesters signed this 30th day of October, 1865.

FRANCIS C. COPPAGE.

Witnesses:
 ALEXR. A. C. KLAUCKE,
 JOHN A. WIEDERSHEIM.